(12) United States Patent
Sun

(10) Patent No.: US 8,059,734 B1
(45) Date of Patent: Nov. 15, 2011

(54) MIMO EQUALIZATION FOR WIRELESS COMMUNICATION SYSTEMS

(75) Inventor: Qinfang Sun, Santa Clara, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 916 days.

(21) Appl. No.: 12/043,497

(22) Filed: Mar. 6, 2008

Related U.S. Application Data

(60) Provisional application No. 60/909,383, filed on Mar. 30, 2007.

(51) Int. Cl.
*H04K 1/10* (2006.01)
*H04B 1/00* (2006.01)
*H04L 12/26* (2006.01)

(52) U.S. Cl. .................. 375/260; 375/144; 370/241

(58) Field of Classification Search .............. 375/260, 375/144; 370/241
See application file for complete search history.

(56) References Cited

U.S. PATENT DOCUMENTS

| 7,411,547 | B2* | 8/2008 | van Rooyen et al. | 342/377 |
| 7,532,660 | B2* | 5/2009 | Chae et al. | 375/144 |
| 2004/0104844 | A1* | 6/2004 | Rooyen et al. | 342/377 |
| 2004/0114506 | A1* | 6/2004 | Chang et al. | 370/208 |
| 2005/0099937 | A1* | 5/2005 | Oh et al. | 370/207 |
| 2006/0227909 | A1* | 10/2006 | Thomas et al. | 375/346 |
| 2009/0046588 | A1* | 2/2009 | Matsumoto et al. | 370/241 |

* cited by examiner

*Primary Examiner* — David C. Payne
*Assistant Examiner* — Sarah Hassan
(74) *Attorney, Agent, or Firm* — Bever, Hoffman & Harms, LLP; Jeanette S. Harms

(57) ABSTRACT

A method to equalize multiple-input multiple-output (MIMO) signals assigns a weight to the output of each receive chain in the MIMO system based on a first noise power value in each receive chain. A second noise power value can be computed using a difference between identical symbols from one or more weighted/un-weighted receive chain signals. Notably, the second noise power value includes thermal noise, phase noise, quantization noise, and distortion noise. The weighted outputs of the receive chains and the second noise power estimate may be used in an equalization calculation to recover the input signal.

18 Claims, 4 Drawing Sheets

Receive Chain 102

MIMO EQUALIZATION FOR WIRELESS COMMUNICATION SYSTEMS

RELATED APPLICATIONS

This application claims priority of U.S. Provisional Patent Application 60/909,383, entitled "MIMO Equalization For Wireless Communication Systems" filed Mar. 30, 2007.

BACKGROUND OF THE INVENTION

1. Field of the Invention

Embodiments of this specification generally relate to wireless communication systems and more particularly to equalizing multiple-input multiple-output (MIMO) signals.

2. Description of the Related Art

Wireless communication systems may enable the transfer of data between a transmitter and multiple receivers. MIMO wireless communication systems may provide improved performance when compared to single-input-single-output systems. The improved performance may be provided by, in part, using multiple receivers to receive multiple transmitted signals. MIMO wireless communication systems may be governed, in part, by standards, such as IEEE standard (draft) 802.11n. Such standards may describe how a MIMO system receives and recovers a MIMO signal. In one embodiment, a MIMO system may be described by the equation $$y = H \cdot x + n \quad \text{(eq. 1)}$$

where H is a channel matrix (wherein computing the channel matrix H is well known in the art), x is a vector of input signals (hereinafter referred to as the x input signal), n is a vector of noise, and y is a vector of output signals.

A MIMO system may include multiple receivers configured to receive a MIMO signal. FIG. 1A illustrates a portion of an exemplary, prior art MIMO system 100 include "m" receive chains, wherein m is an integer equal to or greater than 2. In system 100, each receive chain 102 receives a MIMO signal via an antenna 101. Each receive chain 102 may produce a receive chain signal, denoted as $y_i$ in FIG. 1A. In general, a MIMO system may equalize the outputs of the multiple receive chains to recover the x input signal. One way to recover the x input signal in a MIMO system uses a Minimum Mean Square Error (MMSE) detector. The MMSE detector may be described by the equation $$x = (H^*H + \sigma^2 I)^{-1} H^* \cdot y \quad \text{(eq. 2)}$$

where $\sigma^2$ is a noise power value and I is the identity matrix. Oftentimes, recovering the x input signal may be referred to as equalizing y and $(H^*H + \sigma^2 I)^{-1} H^*$ may be referred to as the equalization coefficient. Equation 2 assumes that the noise power value is the same on all receive chains.

As shown in FIG. 1A, equalization may occur in an equalizer 103, which receives the output signal vectors y, from the multiple receive chains 102. However this approach has disadvantages. Specifically, if one or more of receive chains have relatively noisy receive chain signals (and therefore are of lower relative quality), and these receive chains signals are equally weighted with receive chains signals that have relatively lower amounts of noise (and are therefore of higher relative quality) during equalization, then the overall performance of the MIMO system is degraded because the equalized signal is of relatively lower quality.

As equation 2 above illustrates, a noise power value is typically required to recover the x input signal when using an MMSE detector. The noise power value may be determined by periodically measuring the receive power of a receive chain 102 during a quiet period, i.e. a period when no signals are being received. Because no signals are being received, the resulting measurement represents noise as seen by the receive chain 102. Typically, the receive power may be determined by examining the output of an analog front end, squaring that output, and then averaging the squares.

FIG. 1B illustrates an exemplary receive chain 102 including an analog front end 111 and a digital signal processing unit 115. Analog front end 111 includes a variable gain amplifier (VGA) 112, an analog to digital converter (ADC) 113, and an automatic gain controller (AGC) 114. Digital signal processing unit 115 includes a Fast Fourier Transform (FFT) unit 116. As shown, the input to VGA 112 may be provided by antenna 101. The output of VGA 112 may be provided to ADC 113. The output of ADC 113 may be provided to both AGC 114 and FFT unit 116. AGC 114 determines the gain of VGA 112 by examining, among other things, the output of ADC 113. The output of AGC 114 is provided to VGA 112. The output of FFT unit 116 produces the receive chain signal $y_i$.

As described above, noise power value may be determined by measuring receive power during a quiet period. Such a measurement may be implemented using analog front end 111 of receive chain 110. For example, during a quiet period, the receive power may be determined by measuring, squaring, and averaging the outputs of ADC 113. Often, AGC 114 may set the gain of VGA 112 to a value such that the output of ADC 113 (and therefore the noise power value) is not limited by the upper or lower bounds of ADC 113.

Therefore, a noise power measurement may be associated with a particular VGA gain setting. As is well-known, a noise power measurement may be scaled using the VGA gain setting information to represent the noise power present at the input of the analog front end. This is often referred to as a root-mean-square (RMS) noise power value. Determining noise power in this way advantageously uses relatively smaller amounts of hardware and relatively smaller amounts of computation and in doing so produces a noise power value relatively quickly and is ready to use when receiving an actual receive chain signal.

Determining a noise power value in the above manner, however, has several disadvantages. A first disadvantage is that such a noise power value may not include several sources of noise. For example, although the method may capture thermal noise power, the method may not capture phase noise, quantization error, or distortion. This is because these other noise sources may be determined by measuring an actual receive chain signal in operation, not by measuring receive power during a quiet period.

A second disadvantage is that the accuracy of the noise power value may depend upon the linearity of the VGA. This is because the noise power value may be scaled in accordance with a gain setting within the VGA.

A third disadvantage is that the power measurement path (which includes the analog front end of a receive chain) may be different from the data path (which includes the analog front end and FFT unit of a receive chain). Although this may be overcome by scaling the determined noise power value by any signal gains or losses that may occur in the data path relative to the power measurement path, scaling is undesirable because it must be re-examined each time new hardware is developed (i.e. hardware may significantly affect the scaling factor).

Therefore, a noise power value determined in the manner described above may be inaccurate. As a result, the performance of MIMO equalizer 103 (FIG. 1A) receiving the multiple receive chain signals y, may be degraded.

Therefore, what is needed is a way to improve the recovery of input signals transmitted in a MIMO system, especially when one or more of the received MIMO signals may be relatively noisy.

SUMMARY OF THE INVENTION

MIMO wireless communication systems may provide improved performance compared to single-input single-output systems. This performance improvement may be due, in part, to receiving multiple signals from multiple receive chains. Unfortunately, equalizing such signals with equal weight may not produce a relatively higher quality signal because one or more noisy receive signals may produce an equalized signal of relatively lower quality.

An optimized method for reducing the contribution of a noisy receive chain signal is to weight receive chain signals so that relatively less noisy receive chain signals are assigned relatively greater weights. In one such optimized method, first noise power values can be determined for each receive chain. Using these first noise power values and the gains associated with the respective receive chains, weights for the receive chains can be computed. Weighted receive chain signals can then be computed based on the weights and the receive chain signals. Second noise power values can be generated by computing a difference between identical symbols, e.g. training symbols, from at least one weighted/un-weighted receive chain signal. At this point, the weighted receive chain signals from the multiple receive chains can be equalized using the second noise power values.

In one embodiment, the first noise power value is a root-mean-square (RMS) noise power value, e.g. a noise power present at an input of an analog front end of the receiver chain. In another embodiment, when a difference between an actual receive signal power and the first noise power value is greater than a maximum effective signal to noise ratio (SNR), then the first noise power value can be set to a difference between the actual receive signal power and the maximum effective SNR to account for quantization error, phase noise, and distortion. Note that the maximum effective SNR value may be programmable.

Computing the weight for the receive chain can be described by:

$$w_i = \frac{\min_i(g_i\sigma_i)}{g_i\sigma_i}$$

where $g_i$ is a gain associated with the receive chain, $\sigma_i$ is the first noise power value, i is the index of the receive chain, and min determines a minimum value of all $g_i\sigma_i$ products for all i. In one embodiment, the gain $g_i$ can be a current gain setting that an automatic gain control (AGC) of the receive chain applies to a variable gain amplifier (VGA) of the receive chain. Computing the weighted receive chain signal can be described by:

$$\tilde{y} = w_i y_i$$

where $y_i$ is the receive chain signal. Equalizing the weighted receive chain signals can be described by:

$$x = (\tilde{H}^*\tilde{H} + \sigma_s^2 I)^{-1}\tilde{H}^*\tilde{y}$$

where x is a vector of input signals, $\tilde{H}$ is a weighted channel matrix, $\sigma_s^2$ is the second noise power value, I is an identity matrix, and $\tilde{y}$ is the weighted receive chain signal, wherein $\tilde{H} = WH$, where W is a weighting matrix and H is a channel matrix. where x is a vector of input signals, H is a channel matrix. The second noise power value $\sigma_s^2$ can be described by:

$$\left.\begin{aligned} q_1 &= s + n_1 \\ q_2 &= s + n_2 \end{aligned}\right\} \Rightarrow \sigma_s^2 = \frac{|q_1 - q_2|^2}{2}$$

where s is an identical symbol transmitted twice, $q_1$ and $q_2$ are two received identical symbols, and $n_1$ and $n_2$ are noise/distortion associated with the two identical symbols.

In another embodiment, a method of equalizing a MIMO signal includes, for each receive chain, using a thermal noise power value, a gain, and a receive chain signal to compute a weighted receive chain signal. A designated receive chain signal set (i.e. one or more weighted/un-weighted receive chain signals) can be used to compute the second noise power value. Notably, the second noise power value includes thermal noise, phase noise, quantization noise, and distortion noise. At this point, the weighted receive chain signals from the multiple receive chains can be equalized using the computed second noise power value.

A MIMO receiver system is also provided. In this system, which includes multiple receive chains, each receive chain receives a receive chain signal and outputs a first noise power value associated with the receive chain, a gain associated with the receive chain, and the receive chain signal. A chain weighting unit can (1) receive the first noise power value, the gain, and the receive chain signal from each receive chain, (2) compute a weighted receive chain signal associated with each receive chain based on the first noise power value, the gain, and the receive chain signal from each receive chain, (3) output the weighted receive chain signal associated with each receive chain. An equalizer can then receive the weighted receive chain signals associated with each receive chain and output a received signal.

In another embodiment of a MIMO receiver system, the chain weighting unit uses a set of values from each receive chain for computing weighted receive chain signals. Note that each weighted receive chain signal is associated with one receive chain. The set of values consists of a thermal noise power value, a gain, and a receive chain signal. An equalizer receives the weighted receive chain signals associated with the multiple receive chains and outputs a received signal that takes into account thermal noise, phase noise, quantization noise, and distortion noise.

DETAILED DESCRIPTION

Figure 1A:
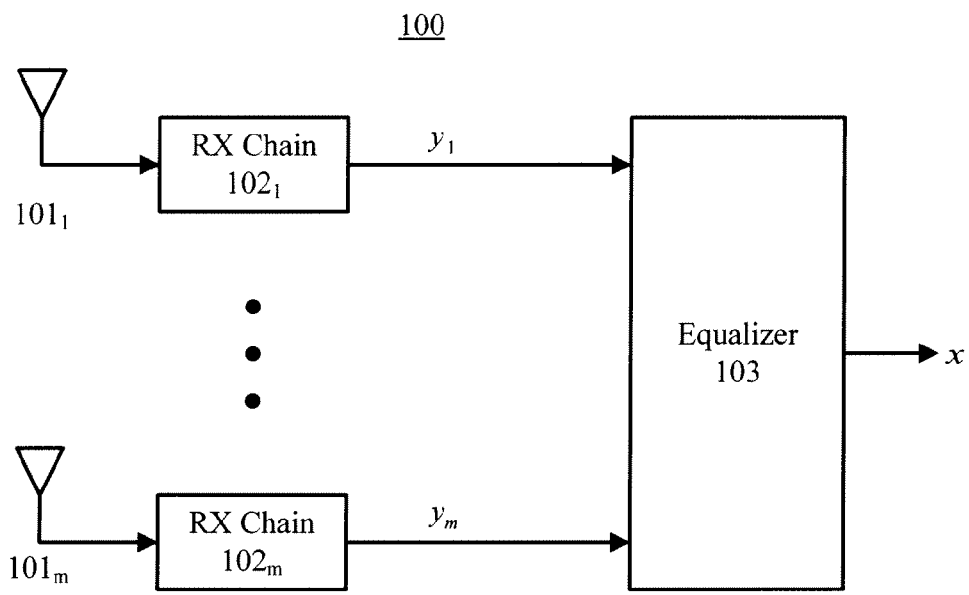
FIG. 1A is a block diagram illustrating a portion of a prior art MIMO system.
Figure 1B:
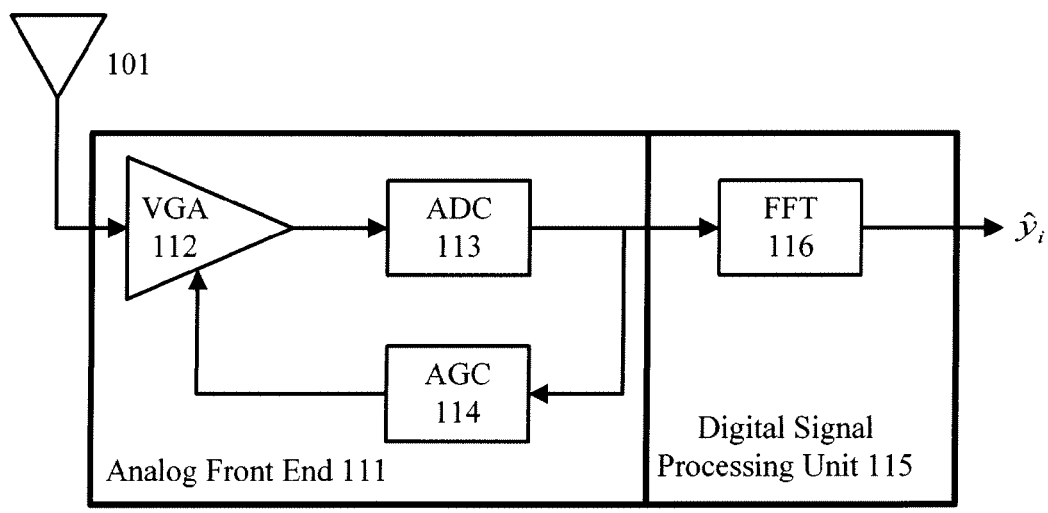
FIG. 1B is a block diagram illustrating a prior art MIMO receive chain.

MIMO wireless communication systems may provide improved performance compared to single-input single-output systems by using multiple receivers (implementable as multiple receive chains). This performance improvement may be due, in part, to receiving signals from multiple receive chains. However, as described above, equalizing such signals with equal weight may not produce a relatively higher quality signal because one or more noisy receive signals may produce an equalized signal of relatively lower quality.

One method for reducing the contribution of a noisy receive chain signal is to weight receive chain signals so that relatively less noisy receive chain signals are assigned relatively greater weights. In one embodiment, the weights may be determined, in part, by a noise power value of the respective receive chain. The weighted receive chain signal may be described by the equation $$\tilde{y}_i = w_i y_i \qquad (eq. 3)$$

where $w_i$ is a chain weight associated with an individual receive chain signal, $y_i$ is the individual receive chain signal, and $i$ is the index of receive chains. In one embodiment, the chain weight $w_i$ may be described by the equation $$w_i = \frac{\min_i(g_i \sigma_i)}{g_i \sigma_i} \qquad (eq. 4)$$

where $g_i$ is a gain associated with the individual receive chain and $\sigma_i$ is a first noise power value (more specifically a root-mean-square (RMS) noise power value) as described above associated with the individual receive chain. The min function in equation 4 determines the minimum value of all $g_i \sigma_i$ products for all $i$. In one embodiment, the chain weight $w_i$ may be inversely proportional to the gain $g_i$ because a relatively weaker signal would require relatively more gain and may be weighted lighter. All values of $w_i$ may be written in matrix form and represented by the matrix W such that values of $w_i$ appear on the diagonal.

As noted above, the gain $g_i$ is the gain setting that is associated with an individual receive chain. Often, the gain $g_i$ is the gain setting that the AGC applies to the VGA and may be determined relatively early during packet detection. In one embodiment, the first noise power value $\sigma_i$ may be a root-mean-square (RMS) noise power value as described above (i.e. the noise power present at the input of the analog front end). Notably, the gain $g_i$ may not be the same gain setting used to determine the first noise power value $\sigma_i$. For example, this noise power value may be determined by measuring the receive power of a receive chain during a quiet period, i.e. a period when no signals are being received.

This weight determination advantageously allows the weights to be determined relatively early during packet detection because both $g_i$ and $\sigma_i$ may be available relatively early during packet detection. Moreover, weighting each receive chain signal in this manner advantageously scales the receive chain signals so that the effective noise power is relatively similar.

Note that, in some cases, the first noise power value $\sigma_i$ may not be optimal. For example, when a receive chain signal is relatively strong, the dominant noise sources for that receive chain may be quantization error, phase noise, and distortion rather than thermal noise. For example, for any particular hardware implementation, an effective signal to noise ratio (SNR) may be upper-bounded by a fixed value which may be a value independent of the strength of an actual receive signal. In cases when the difference between the actual receive signal power and the first noise power value is greater than the maximum effective SNR (i.e. the actual receive signal is relatively strong), then the first noise power value instead may be set to the difference between the actual receive signal power and the maximum effective SNR to account for quantization error, phase noise, and distortion. For example, if the first noise power value is 60 dB below the actual receive signal power, but the maximum effective SNR is 35 dB, then the first noise power value for chain weight determination may be set to 35 dB below the actual receive signal power.

In some embodiments, the maximum effective SNR value may be programmable. In other embodiments, the weight of each receive chain may be biased toward one or more particular chains. This bias may be used to compensate for things such as particular printed circuit board layout characteristics, silicon characteristics, antenna characteristics, and the like.

Figure 2:
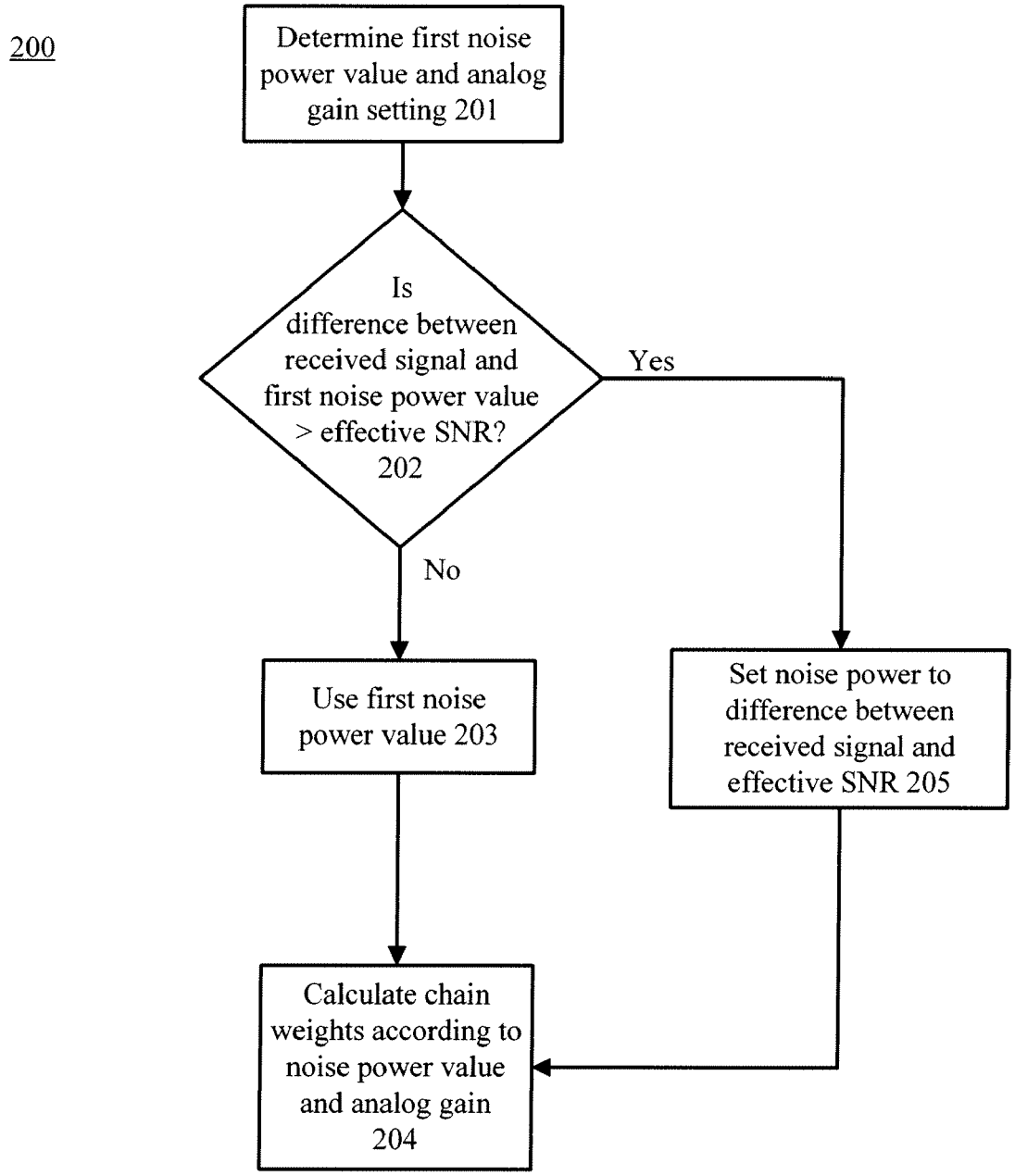
FIG. 2 is a flow chart of method steps for determining chain weights.

FIG. 2 illustrates an exemplary method 200 for determining chain weights. Step 201 begins by determining a first noise power value $\sigma_i$ and an analog gain setting $g_i$ for a receive chain. In some embodiments, the first noise power value may be a root-mean-square (RMS) noise power value and $g_i$ may be the current analog gain setting of the receive chain.

Step 202 next determines the difference between the strength of the actual receive chain signal and the first noise power value $\sigma_i$. Step 202 further determines if that difference is greater than an effective SNR. If so, then step 205 sets the first noise power value to the strength of the actual receive chain signal subtracted by the effective SNR. On the other hand, if the difference between the strength of the actual receive chain signal and the first noise power value $\sigma_i$ is not greater than the effective SNR, then step 203 uses the first noise power value $\sigma_i$ (as previously determined in step 201). Step 204, which follows either step 203 or step 205, calculates the chain weights for each receive chain. In one embodiment, the chain weights may be calculated using equation 4.

The equalization of receive chain signals for MIMO systems may be prone to inaccuracies because of the difficulty in providing relatively accurate noise power values. As described above, the first noise power value may be determined by periodically measuring the receive power in a receive chain during a quiet period and the current gain setting. This method advantageously requires a relatively small amount of hardware and a relatively small amount of computation. Therefore, this method is relatively easy to implement. This first method, however, does not take noise sources such as phase noise, quantization error, or distortion into account. For example, the noise power values determined as described above may not take into account noise due to elements within the data processing path. Noise power values determined as described above may also be affected by the linearity of a VGA in the data processing path.

These shortcomings may be addressed by using a second noise power value. The second noise power value $\sigma_s^2$ computes the difference between two identical symbols from a receive chain signal. In one embodiment, a symbol may be an OFDM symbol as defined by IEEE standard (draft) 802.11n and IEEE standard 802.11a. An OFDM symbol includes a plurality of sub-carriers that may be modulated to carry data such as training data or payload data. Notably, the training data advantageously includes both short and long training fields, both of which include known, identical symbols. Specifically, the training fields for MIMO signals are defined in the IEEE standard (draft) 802.11n. For example, the short training field includes 10 identical short symbols, whereas the long training field includes 2 identical long symbols.

Because the symbols used to compute the second noise power value are identical, the difference represents phase noise, quantization error, and distortion. In one embodiment, $\sigma_s^2$ may be described by the equation $$\left.\begin{array}{l}q_1 = s + n_1\\q_2 = s + n_2\end{array}\right\} \Rightarrow \sigma_s^2 = \frac{|q_1 - q_2|^2}{2} \qquad \text{(eq. 5)}$$

where s is the identical symbol transmitted twice, $q_1$ and $q_2$ are the two received symbols, and $n_1$ and $n_2$ are the noise/distortion associated with the respective symbols. In one embodiment, the identical symbols may be included as portions of a receive chain signal that has been processed by the DSP unit. In another embodiment, the second noise power $\sigma_s^2$ may be the average of the second noise power from each of the receive chains.

In one embodiment, the long symbols of the long training field may be used. Note that longer symbols, such as those found in the long training field, may produce relatively more accurate noise power values than shorter symbols, such as those found in the short training field. That is, since oftentimes an AGC of a receive chain may adjust the gain of a VGA while the receive chain is receiving the short training field, the short symbols of the short training field may be compromised or otherwise inaccurate.

The second noise power value $\sigma_s^2$ advantageously includes not only thermal noise, but also phase noise, quantization noise, and distortion noise because the second noise power value is determined by an actual receive chain signal in operation. Thus, this method is transparent to the analog gain setting of the VGA. Also, the scaling factor between the receive power measurement path and the data path need no longer be considered because the second noise power value may be determined using the data path. This relatively more accurate second noise power value may be used to more accurately equalize received MIMO signals. In one embodiment, a second noise power value is determined for each receive chain signal. An overall second noise power (i.e., $\sigma_s^2$) value may be determined by averaging the second noise power value from each receive chain. Note that in other embodiments, the second noise power value may be determined for a designated receive chain signal set (i.e. at least one receive chain signal). Note further that the second noise power value may be computed using receive chain signals or weighted receive chain signals (described below).

Equalization of the weighted receive chain signal $\tilde{y}_i$ described by equation 3 may be implemented with a modified MMSE detector. The channel matrix H may be weighted by weighting matrix W.

$$\tilde{H} = WH \qquad \text{(eq. 6)}$$

The MMSE detector may be implemented with the weighted channel matrix as described by the equation $$x = (\tilde{H}^*\tilde{H} + \sigma_s^2 I)^{-1} \tilde{H}^* \cdot \tilde{y} \qquad \text{(eq. 7)}$$

where $\tilde{y}$ is a vector of weighted receive chain signals and $\sigma_s^2$ is the second noise power value.

Figure 3:
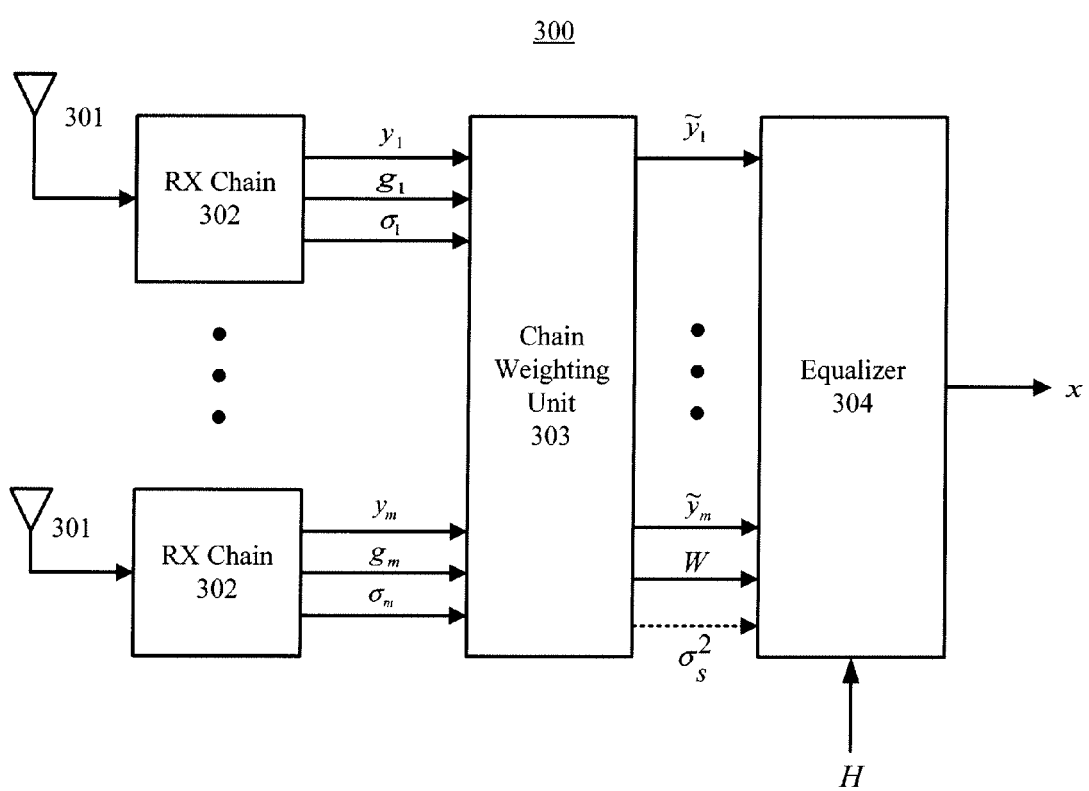
FIG. 3 is a block diagram illustrating a portion of a MIMO receiver system configured according to the specification.

FIG. 3 illustrates a portion of an exemplary MIMO receiver system 300 configured according to the specification. In this embodiment, MIMO receiver system 300 includes multiple receive chains 302 (i.e. "m" receive chains, where m is an integer equal to or greater than 2), a chain weighting unit 303, and an equalizer 304. The inputs of receive chains 302 may be coupled to antennas 301 and the outputs of receive chains 302 may be coupled to chain weighting unit 303. Chain weighting unit 303 may be coupled to equalizer 304.

Notably, each receive chain 302 generates not only $y_i$, but also $g_i$ and $\sigma_i$. These receive chain outputs are provided to chain weighting unit 303, which in turn can compute the weights $w_i$ and the weighted receive chain outputs $\tilde{y}_i$. The chain weighting unit 303 may provide the weighting matrix W to the equalizer 304. Equalizer 304 may use a designated set of weighted receive chain outputs $\tilde{y}_i$ (at least one) to compute the second noise power value. In another embodiment, chain weighting unit 303 may use a designated set of (un-weighted) receive chain signals $y_i$ and the chain weights $w_i$ to compute the second noise power value $\sigma_s^2$ (shown as a dotted line in FIG. 3). The second noise power value from each un-weighted receive chain may be weighted by its respective chain weight $w_i$ and then the weighted second noise power values may be averaged to compute an overall second noise power value $\sigma_s^2$. In yet another embodiment, equalizer 304 may use a set of designated un-weighted receive chain signals $y_i$ (not shown in FIG. 3 for simplicity) and the chain weights $w_i$ to compute the second noise power value. As described in further detail below, using the second noise power value (however computed), the weighting matrix W and the channel matrix H, the equalizer 304 can equalize the weighted receive chain output signals to recover the x input signal.

Figure 4:
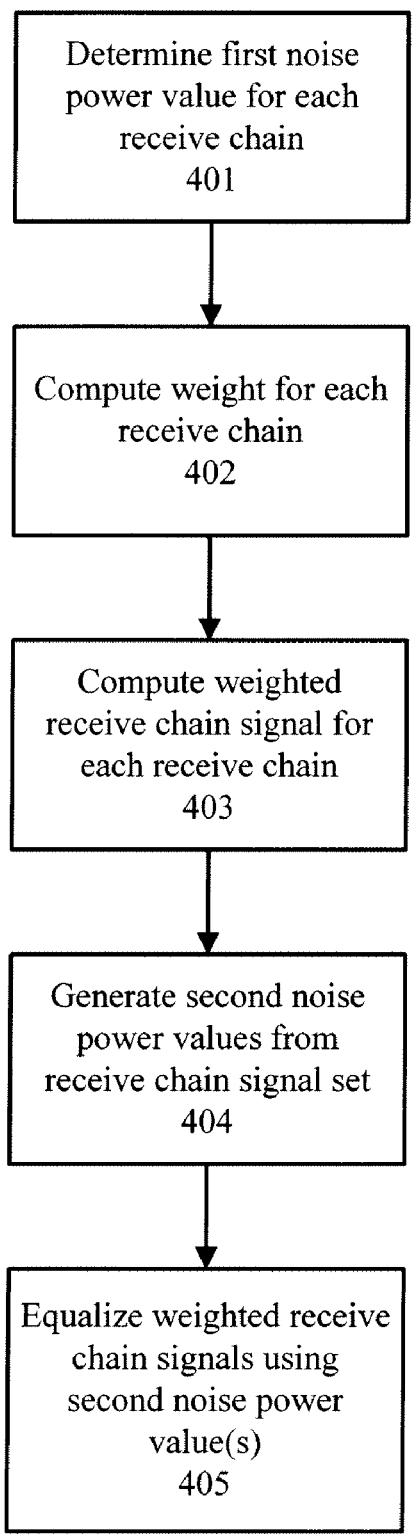
FIG. 4 is a flow chart of method steps for equalizing a MIMO signal according to the specification.

FIG. 4 illustrates a method 400 for equalizing a MIMO signal according to the specification. Step 401 begins by determining the first noise power value for each receive chain in the MIMO system. Step 402 computes the weight for each receive chain. (Note that steps 401 and 402 are described in greater detail in the discussion of FIG. 2). Step 403 can compute the weight for each receive chain signal $y_i$, e.g. using equations 3 and 4 above. Step 404 can generate the second noise power value $\sigma_s^2$ from the designated set of weighted/un-weighted receive chain signals, as described above in reference to FIG. 3. Finally, step 405 can equalize the weighted receive chain signals. In one embodiment, this equalization may be described by equation 7 using the second noise power values $\sigma_s^2$ for the noise power value $\sigma^2$ and the weighted receive chain signal $\tilde{y}_i$ for the receive chain signal $y_i$.

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method of equalizing a multiple-input multiple-output (MIMO) signal in a MIMO system, the MIMO system including multiple receive chains, the method comprising:
   for each receive chain:
      determining a first noise power value of a receive chain signal;
      computing a weight for the receive chain based on a gain associated with the receive chain and the first noise power value; and
      computing a weighted receive chain signal based on the weight and the receive chain signal;
   generating a second noise power value by computing a difference between identical symbols from a designated receive chain signal set, the designated receive chain signal set including one of: at least one weighted receive chain signal and at least one receive chain signal; and
   equalizing the weighted receive chain signals from the multiple receive chains using the second noise power value.

2. The method of claim 1, wherein the first noise power value is a root-mean-square (RMS) noise power value.

3. The method of claim 2, wherein the RMS noise power value includes a noise power present at an input of an analog front end of the receiver chain.

4. The method of claim 2, wherein when a difference between an actual receive signal power and the first noise power value is greater than a maximum effective signal to noise ratio (SNR), then setting the first noise power value to a difference between the actual receive signal power and the maximum effective SNR to account for quantization error, phase noise, and distortion.

5. The method of claim 4, wherein the maximum effective SNR value is programmable.

6. The method of claim 1, wherein computing the weight for the receive chain is described by:

$$w_i = \frac{\min_i(g_i \sigma_i)}{g_i \sigma_i}$$

where $g_i$ is a gain associated with the receive chain, $\sigma_i$ is the first noise power value, i is the index of the receive chain, and min determines a minimum value of all $g_i \sigma_i$ products for all i.

7. The method of claim 6, wherein the gain $g_i$ is a current gain setting that an automatic gain control (AGC) of the receive chain applies to a variable gain amplifier (VGA) of the receive chain.

8. The method of claim 6, wherein computing the weighted receive chain signal is described by:

$$\tilde{y}_i = w_i y_i$$

where $y_i$ is the receive chain signal.

9. The method of claim 1, wherein the identical symbols are training symbols of the receive chain signal.

10. The method of claim 8, wherein equalizing the weighted receive chain signals is described by:

$$x = (\tilde{H}^* \tilde{H} + \sigma_s^2 I)^{-1} \tilde{H}^* \cdot \tilde{y}$$

where x is a vector of input signals, $\tilde{H}$ is a weighted channel matrix, $\sigma_s^2$ is the second noise power value, I is an identity matrix, and $\tilde{y}$ is the weighted receive chain signal, wherein $\tilde{H} = WH$, where W is a weighting matrix and H is a channel matrix.

11. The method of claim 10, wherein $\sigma_s^2$ is described by:

$$\left. \begin{array}{l} q_1 = s + n_1 \\ q_2 = s + n_2 \end{array} \right\} \Rightarrow \sigma_s^2 = \frac{|q_1 - q_2|^2}{2}$$

where s is an identical symbol transmitted twice, $q_1$ and $q_2$ are two received identical symbols, and $n_1$ and $n_2$ are noise/distortion associated with the two identical symbols.

12. A method of equalizing a multiple-input multiple-output (MIMO) signal in a MIMO system, the MIMO system including multiple receive chains, the method comprising:

for each receive chain, using a thermal noise power value, a gain, and a receive chain signal to compute a weighted receive chain signal;

using a designated receive chain signal set to compute a second noise power value by computing a difference between identical symbols from one or more weighted/un-weighted receive chain signals, the second noise power value including thermal noise, phase noise, quantization noise, and distortion noise; and equalizing the weighted receive chain signals from the multiple receive chains using the computed second noise power value.

13. The method of claim 12, further including computing the weighted receive chain signal as described by:

$$\tilde{y}_i = w_i y_i$$

where $w_i$ is a weight for the receive chain and $y_i$ is the receive chain signal.

14. The method of claim 13, further including computing the weight for the receive chain as described by:

$$w_i = \frac{\min_i(g_i \sigma_i)}{g_i \sigma_i}$$

where $g_i$ is a gain associated with the receive chain, $\sigma_i$ is the thermal noise power value, i is the index of the receive chain, and min determines a minimum value of all $g_i \sigma_i$ products for all i.

15. The method of claim 12, wherein equalizing the weighted receive chain signals is described by:

$$x = (\tilde{H}^* \tilde{H} + \sigma_s^2 I)^{-1} \tilde{H}^* \cdot \tilde{y}$$

where x is a vector of input signals, $\tilde{H}$ is a weighted channel matrix, $\sigma_s^2$ is the second noise power value, I is an identity matrix, and $\tilde{y}$ is the weighted receive chain signal, wherein $\tilde{H} = WH$, where W is a weighting matrix and H is a channel matrix.

16. A multiple-input multiple-output (MIMO) receiver system comprising:

multiple receive chains;

a chain weighting unit for using a set of values from each receive chain for computing weighted receive chain signals, each weighted receive chain signal being associated with one receive chain, the set of values consisting of a thermal noise power value, a gain, and a receive chain signal to compute a weighted receive chain signal; and an equalizer for receiving the weighted receive chain signals associated with the multiple receive chains and outputting a received signal that takes into account thermal noise, phase noise, quantization noise, and distortion noise.

17. The method of claim 1, wherein the second noise power value is an overall value computed by averaging second noise power values from each receive chain.

18. The method of claim 12, wherein the second noise power value is an overall value computed by averaging second noise power values from each receive chain.

* * * * *